United States Patent
Garcia

(10) Patent No.: US 11,352,081 B2
(45) Date of Patent: Jun. 7, 2022

(54) DOLLY APPARATUSES INCLUDING SWING OUT ARM AND AUTOMATIC ARM CLOSING FEATURES

(71) Applicant: Toyota Motor Engineering & Manufacturing North America, Inc., Plano, TX (US)

(72) Inventor: Bradley J. Garcia, Louisville, KY (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 141 days.

(21) Appl. No.: 16/199,711

(22) Filed: Nov. 26, 2018

(65) Prior Publication Data

US 2020/0164936 A1    May 28, 2020

(51) Int. Cl.
  *B62D 65/02*    (2006.01)
  *B62B 3/02*    (2006.01)
  *B62D 65/18*    (2006.01)
  *B62B 5/00*    (2006.01)

(52) U.S. Cl.
  CPC .............. *B62D 65/026* (2013.01); *B62B 3/02* (2013.01); *B62B 5/00* (2013.01); *B62D 65/18* (2013.01)

(58) Field of Classification Search
  CPC .......... B62D 3/02; B62D 5/00; B62D 65/026; B62D 65/18; B62B 3/02; B62B 5/00
  See application file for complete search history.

(56) References Cited

U.S. PATENT DOCUMENTS

| 1,622,084 A | 3/1927 | Briggs |
| 2,685,351 A | 8/1954 | Kramcsak |
| 3,013,369 A | 12/1961 | Wilson et al. |
| 3,651,890 A | 3/1972 | Potrafke |
| 4,793,623 A * | 12/1988 | Talbot .................... B62B 1/142 |
| | | 280/47.24 |
| 2002/0040533 A1 * | 4/2002 | Jahn ..................... G01B 11/275 |
| | | 33/645 |

(Continued)

FOREIGN PATENT DOCUMENTS

EP    2340964 B1    8/2012
GB    1430714 A  *  4/1976    ............... B62B 5/02

*Primary Examiner* — Moshe Wilensky
*Assistant Examiner* — Kyle A Cook
(74) *Attorney, Agent, or Firm* — Dinsmore & Shohl LLP

(57) ABSTRACT

A dolly apparatus for use on an assembly line includes a base frame. A swing out arm is rotatably connected to the base frame by a pivot linkage. An automatic arm closing assembly moves the swing out arm from an installation position to an initial position. The automatic arm closing assembly includes an engagement member located laterally outside the base frame. A swinging linkage is rotatably connected to the base frame. A support rod connects the engagement member to the swinging linkage. A connector rod connects the swinging linkage to the pivot linkage. The engagement member has a retracted position and an extended position. The connector rod moves with rotation of the swinging linkage and rotates the pivot linkage thereby moving the swing out arm from the installation position to the initial position with movement of the engagement member from the extended position to the retracted position.

12 Claims, 5 Drawing Sheets

(56) References Cited

U.S. PATENT DOCUMENTS

2003/0066373 A1* 4/2003 Maeguchi .............. B25J 9/1065
  74/490.01
2008/0276565 A1* 11/2008 Rhodes .................... E04B 1/35
  52/745.01
2017/0129522 A1 5/2017 Lee et al.

* cited by examiner

DOLLY APPARATUSES INCLUDING SWING OUT ARM AND AUTOMATIC ARM CLOSING FEATURES

TECHNICAL FIELD

The present specification generally relates to dolly apparatuses for an assembly line and, more specifically, to dolly apparatuses that include swing out arms and automatic arm closing features.

BACKGROUND

Dolly apparatuses may be used on an assembly line, such as a vehicle assembly line. Dolly apparatuses are currently used that have a swing out arm that can reposition parts closer to their installation location as the vehicles move along the assembly line. These swing out arms may be manually moveable between an initial position and an installation position. After an installation process, the operator may need to move the swing out arm toward the initial position and away from the vehicle in order to avoid contact with the vehicle as the vehicle continues down the assembly line.

What is needed are dolly apparatuses that include an automatic arm closing feature that automatically moves the sing out arm toward the initial position as the vehicle continues down the assembly line.

SUMMARY

In one embodiment, a dolly apparatus for use on an assembly line includes a base frame. A swing out arm is rotatably connected to the base frame by a pivot linkage. An automatic arm closing assembly moves the swing out arm from an installation position to an initial position. The automatic arm closing assembly includes an engagement member located laterally outside the base frame. A swinging linkage is rotatably connected to the base frame. A support rod connects the engagement member to the swinging linkage. A connector rod connects the swinging linkage to the pivot linkage. The engagement member has a retracted position and an extended position. The connector rod moves with rotation of the swinging linkage and rotates the pivot linkage thereby moving the swing out arm from the installation position to the initial position with movement of the engagement member from the extended position to the retracted position.

In another embodiment, an assembly line system for assembling vehicles includes a conveyor including a vehicle support structure including a column structure that supports a vehicle frame thereon. A dolly apparatus for use on an assembly line. The dolly apparatus includes a base frame and a swing out arm that is rotatably connected to the base frame by a pivot linkage. An automatic arm closing assembly moves the swing out arm from an installation position to an initial position. The automatic arm closing assembly includes an engagement member located laterally outside the base frame. A swinging linkage is rotatably connected to the base frame. A support rod connects the engagement member to the swinging linkage. A connector rod connects the swinging linkage to the pivot linkage. The engagement member has a retracted position and an extended position. The connector rod moves with rotation of the swinging linkage and rotates the pivot linkage thereby moving the swing out arm from the installation position to the initial position with movement of the engagement member from the extended position to the retracted position as the engagement member engages the column structure.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are generally related to dolly apparatuses with swing out arms that carry installation components from an initial position to an installation position where the installation components are nearer to an installation location on an assembly. The dolly apparatuses include an automatic arm closing feature that automatically moves the swing out arm from the installation position toward the initial position after the installation process is completed and the assembly continues along the assembly line.

The dolly apparatuses may be used on a vehicle assembly line, as an example. The dolly apparatus may be a wheeled device that is moveable along a conveyor that conveys a vehicle in a conveying direction. The dolly apparatus can synchronize with the vehicle to move in the conveying direction with the vehicle during an installation process. Once the installation process is complete, the dolly apparatus may be uncoupled from the vehicle and then moved in an upstream direction past the vehicle and toward a next vehicle for another installation process. The automatic arm closing feature automatically moves the swing out arm from the installation position toward the initial position and out of the conveying path of the vehicle as the dolly assembly is moved upstream past the vehicle.

Figure 1:
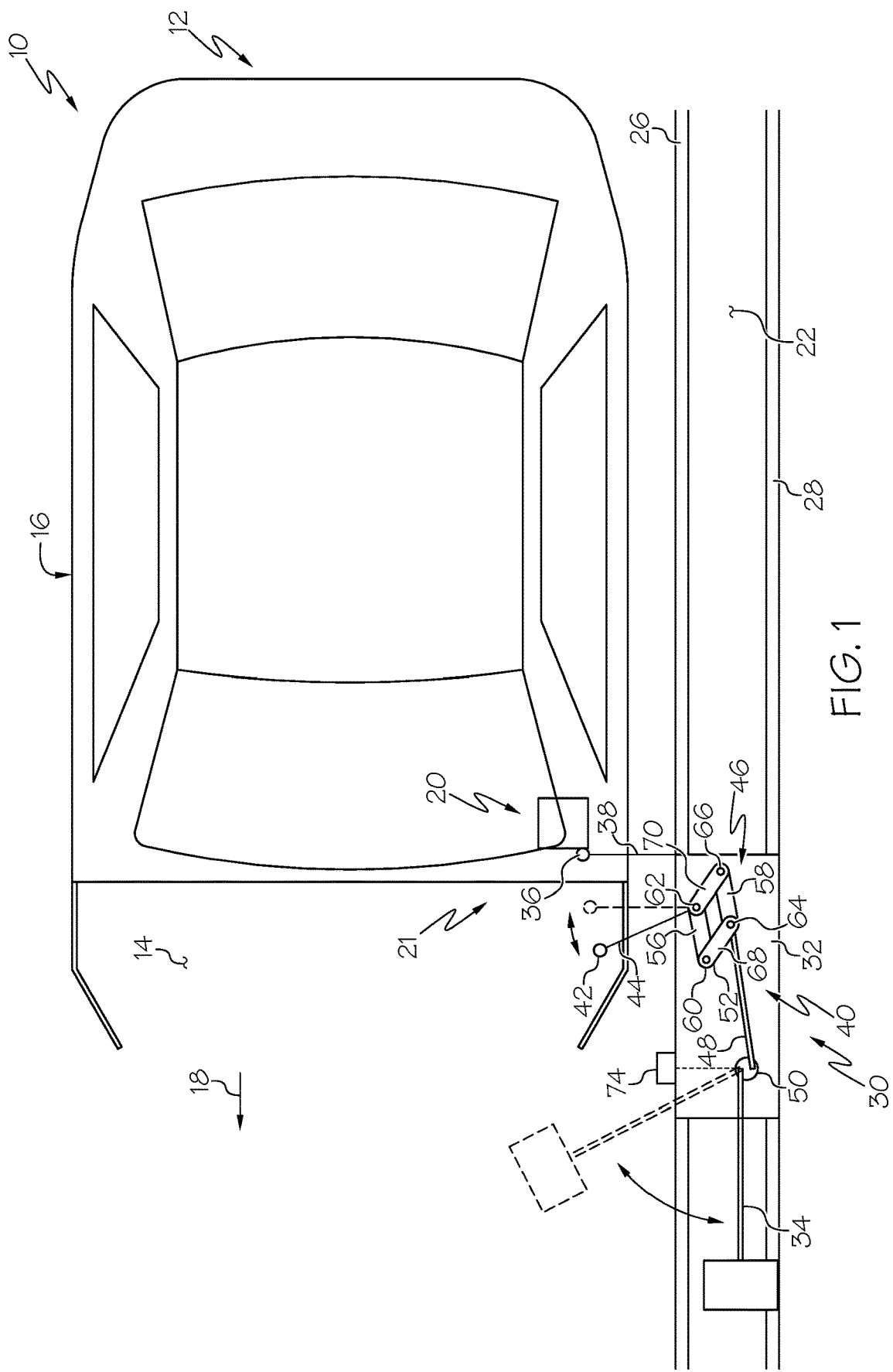
FIG. 1 is a diagrammatic view of a vehicle assembly line system including a dolly apparatus including a swing out arm, according to one or more embodiments shown and described herein.

Referring to FIG. 1, an assembly line system 10 generally includes a conveyor (denoted by element 12) having a conveyor portion 14 that is used to convey a vehicle body 16 in a conveying direction 18 for assembling various components to the vehicle body 16. The conveyor 12 may include any number of support structures that can be used to support the vehicle body 16 on the conveyor portion 14. In the illustrated example, a column structure 20 is illustrated that supports a front corner portion 21 of the vehicle body 16 at a location above the conveyor portion 14. While a single column structure 20 is illustrated, each corner portion of the vehicle body 16 may include a column structure 20, which, together, may be used to support the vehicle body 16 above the conveyor portion 14 in a generally horizontal orientation.

The conveyor 12 may include another conveyor portion 22 that also moves with the conveyor portion 14. The conveyor portion 22 may be used as a moving pathway for installers to move alongside the vehicle body 16 as the vehicle body 16 moves in the conveying direction 18. The conveyor portion 22 may be separated from the conveyor portion 14 by a fixed track 24. The fixed track 24 may include a pair of rails 26 and 28 that do not move with the conveyor portions 14 and 22. The fixed track 24 provides a pathway for a dolly apparatus 30 to travel relative to the conveyor portions 14 and 22 for various installation operations.

The dolly apparatus 30 includes a base frame 32 and a swing out arm 34 that moves relative to the base frame between an initial position and an installation position that is shown by dotted lines. The dolly apparatus 30 includes a synchronization member 36 (e.g., a compressible roller) that is located at an end of a support rod 38 that extends outward from the base frame 32 and into a conveying path of the vehicle body 16. In the illustrated example, the dolly apparatus 30 is synchronized with movement of the vehicle body 16 in the conveying direction 18 using engagement between the synchronization member 36 and the column structure 20. In this way, the dolly apparatus 30 can travel along the fixed track 24 at the same rate as the vehicle body 16 supported by the column structure 20.

The dolly apparatus 30 further includes an automatic arm closing assembly 40. The automatic arm closing assembly 40 links the swing out arm 34 to an engagement member 42 (e.g., another compressible roller) that is connected to another support rod 44. The support rod 44 is connected to a swinging linkage 46 that links the support rod 44 and a connector rod 48 that is connecting to a pivot linkage 50. The pivot linkage 50, in turn, is connected to the swing out arm 34 and is rotatably connected to the base frame 32.

The swinging linkage 46 is a four-bar linkage that includes lateral bars 52 and 54 that extend generally in a cross-conveying direction and longitudinal bars 56 and 58 that extend generally in the conveying direction 18. The longitudinal bars 56 and 58 are rotatably connected to the lateral bars 52 and 54 at pivot locations 60, 62, 64 and 66. The lateral bars 52 and 54 are also rotatably connected to the base frame 32 at rotation axes 68 and 70 so that the lateral bars 52 and 54 can rotate, but not translate relative to the base frame 32. The longitudinal bars 56 and 58 can both rotate and translate relative to the base frame 32 depending on the rotational positions of the lateral bars 52 and 54.

A release control 74 (e.g., a pedal, switch, button, etc.) is provided that can be used to release the pivot linkage 50 from a locked configuration to allow the swing out arm 34 to rotate via the pivot linkage 50. As the dolly apparatus 30 moves toward the vehicle body 16, an installer may actuate the release control 74 which allows the swing out arm 34 to rotate toward the installation position. In some embodiments, the swing out arm 34 may be weighted and arranged to rotate toward the installation position under the force of gravity. In this regard, the swing out arm 34 may be biased toward the installation position by gravity. As the swing out arm 34 swings toward the installation position, the engagement member 42 rotates to its installation position and in-line with the column structure 20 in the conveying direction 18.

Figure 2:
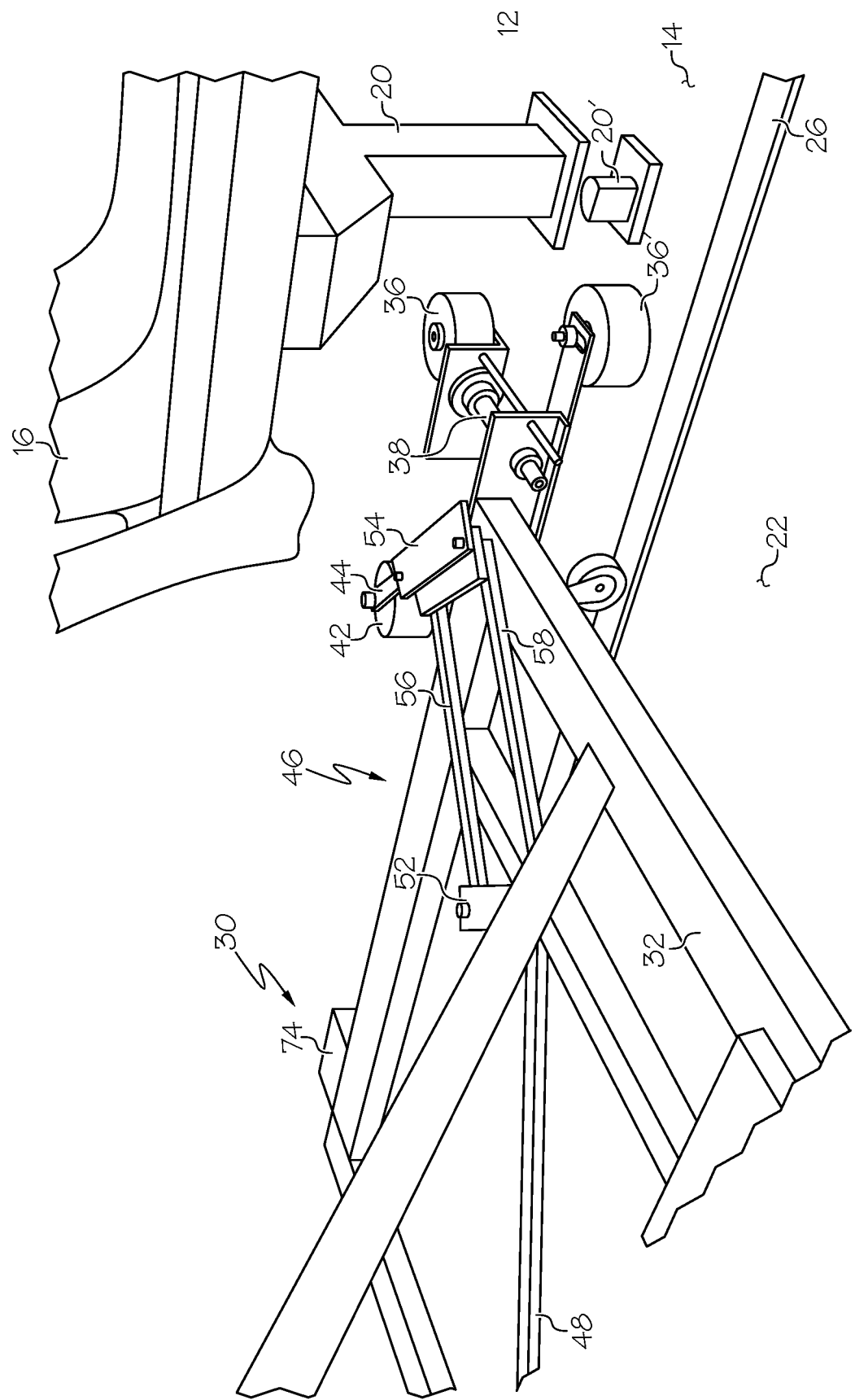
FIG. 2 is a detail, perspective view of the dolly support apparatus of FIG. 1 in use, according to one or more embodiments shown and described herein.

FIGS. 2-5 illustrate operation of the dolly apparatus 30 as it comes into contact with the column structure 20 and synchronizes with movement of the vehicle body 16. Referring first to FIG. 2, the dolly apparatus 30 may be moved along the tracks 26 and 28 upstream toward the vehicle body 16, which is being conveyed downstream in the conveying direction. As shown by FIG. 2, the synchronization member 36 approaches the column structure 20 as the dolly apparatus is moved manually upstream. Further, the engagement member 42 is in a retracted position and the swing out arm 34 (FIG. 1) is in its initial position.

Figure 3:
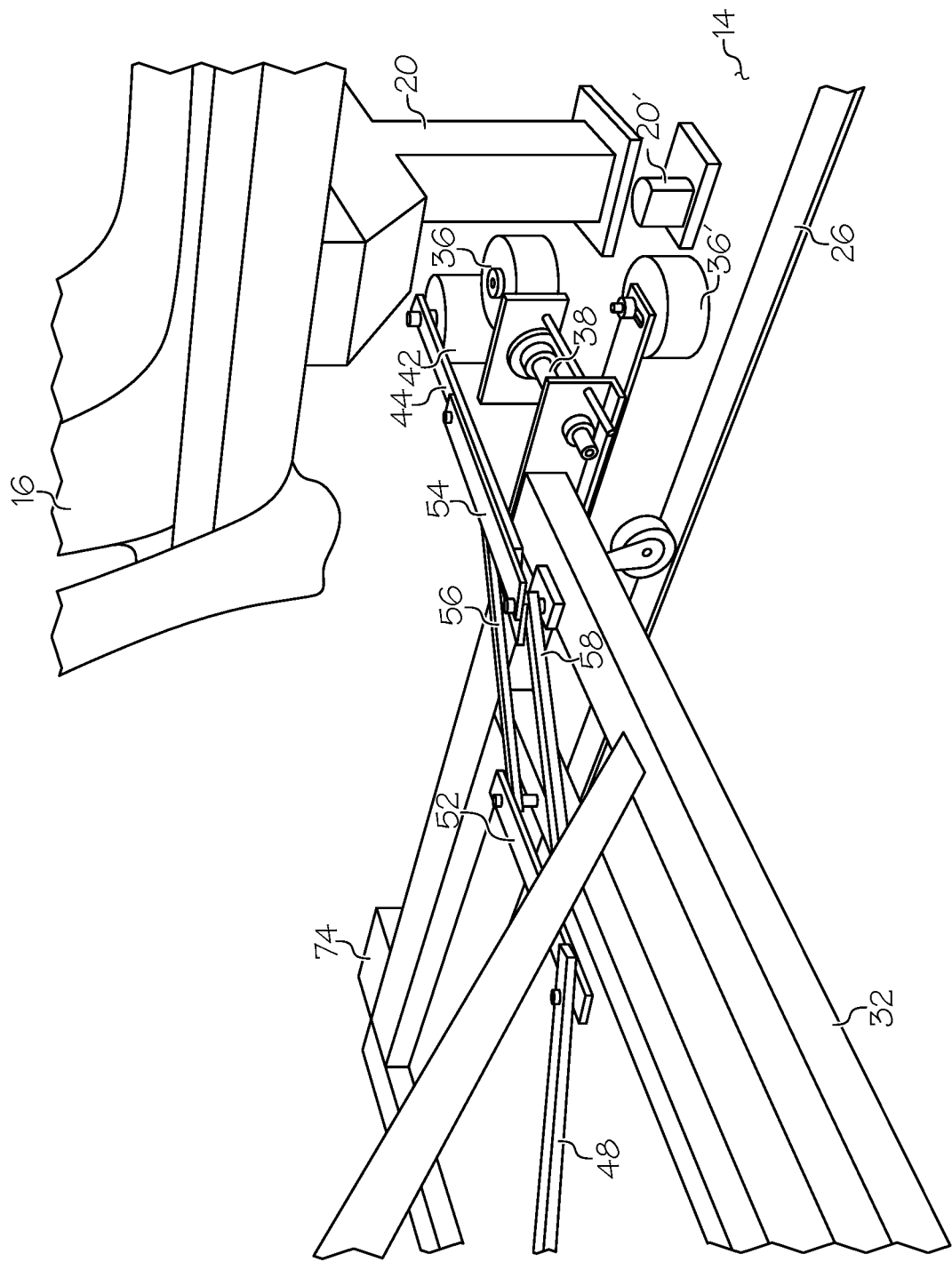
FIG. 3 is a detail, perspective view of the dolly support apparatus of FIG. 1 in use, according to one or more embodiments shown and described herein.

Referring now to FIG. 3, as the dolly apparatus 30 and the synchronization member 36 approach the column structure 20, the release control 74 may be manually actuated, which causes the swing out arm 34 to move into the installation position under the influence of gravity and the engagement member 42 to move into an extended position in line with the column structure 20. An additional synchronization member 36' and column structure 20' may be provided for additional points of contact with the conveyor portion 14. With the dolly apparatus 30 synchronized with the vehicle body 16 through the column structure 20, an installation operation may be performed.

Figure 4:
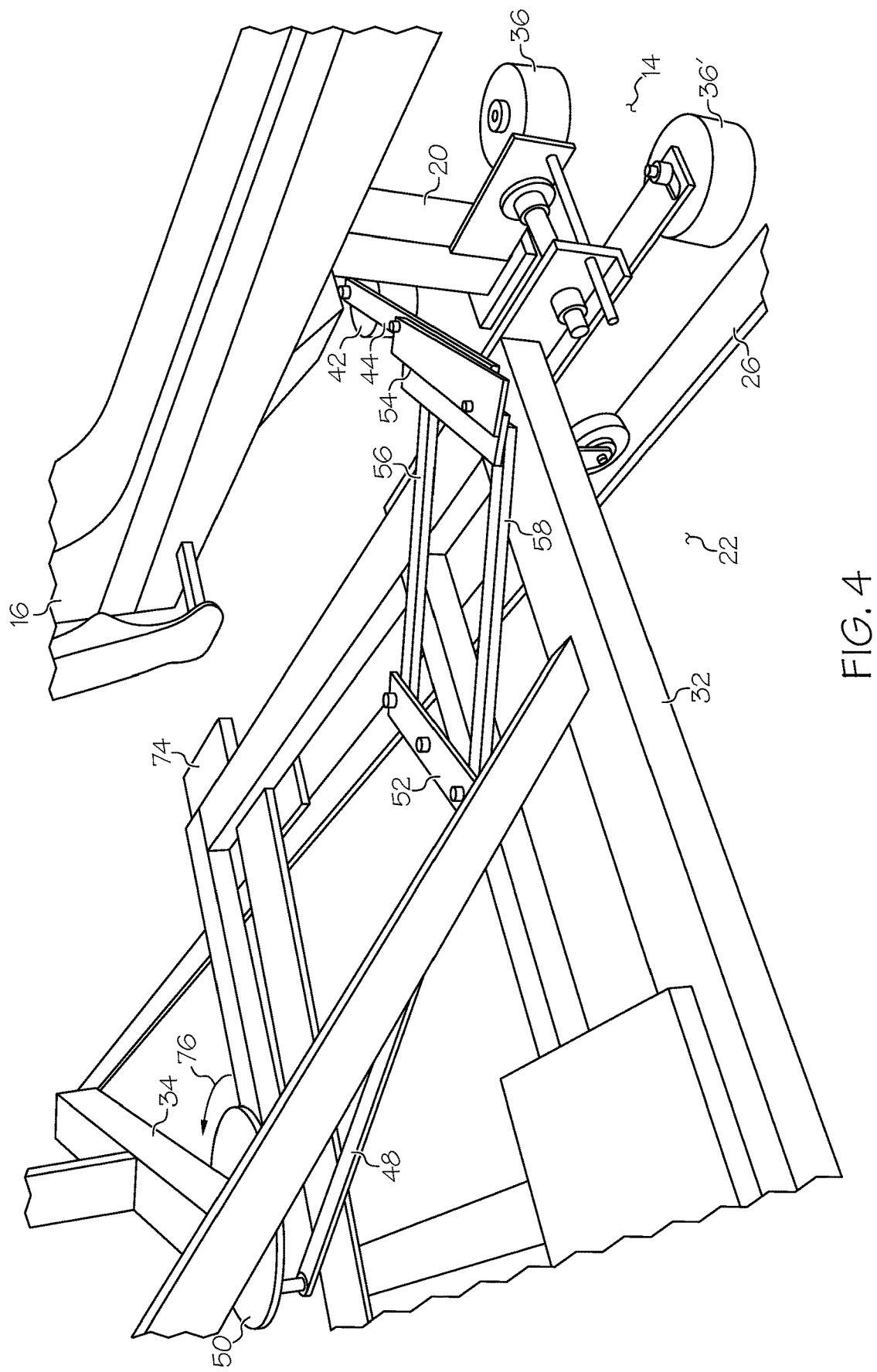
FIG. 4 is a detail, perspective view of the dolly support apparatus of FIG. 1 in use, according to one or more embodiments shown and described herein.

Referring now to FIG. 4, once the installation operation is performed, the dolly structure 30 may stop relative to the column structure 20 and the vehicle 16. With the dolly apparatus 30 stopped, the synchronization member 36 may push past the column structure 20 as shown. In some embodiments, the dolly apparatus 30 may be pushed upstream as the vehicle body 16 and column structure 20 are conveyed in the conveying direction. Continued movement of the column structure 20 relative to the dolly apparatus 30 causes the column structure 20 to engage the engagement member 42 and begin moving the engagement member 42 and the support rod 44 toward the initial position. As the support rod 44 rotates, the swinging linkage including the lateral and longitudinal bars 52, 54, 56 and 58 rotate thereby drawing the connector rod 48 away from the swing out arm 34. This movement of the connector rod 48 causes the pivot linkage 50 to rotate counter-clockwise in the direction of arrow 76. As the swing out arm 34 is rigidly connected to the pivot linkage 50, the swing arm moves toward the initial position.

Figure 5:
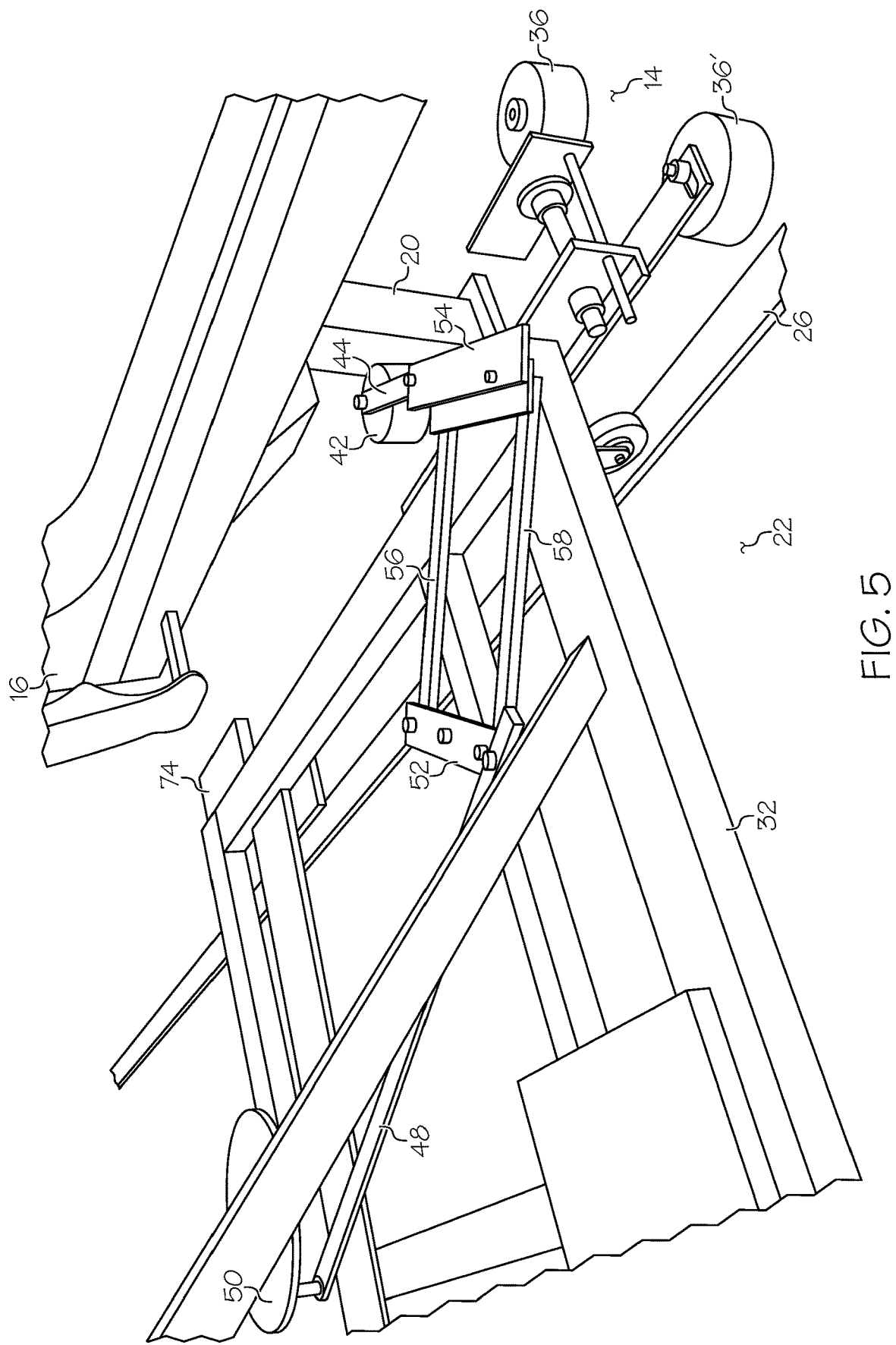
FIG. 5 is a detail, perspective view of the dolly support apparatus of FIG. 1 in use, according to one or more embodiments shown and described herein.

FIG. 5 illustrates the dolly apparatus 30 including the swing out arm 34 in the initial position. As can be seen, the engagement member 42 pushes past the column structure 20, which causes the swing out arm 34 to return to its initial position and the pivot linkage 50 locks in place until the release control 74 is actuated. In this initial position, the swing out arm 34 is out of the conveying path of the vehicle body 16 such that the vehicle body 16 can pass by the swing out arm 34 without contact therewith. Further, the dolly apparatus 30 can be moved upstream to another vehicle body to start the process again.

The above-described dolly apparatuses include a swing out arm and an automatic arm closing assembly that can be used to move the swing out arm from an installation position to an initial position automatically based on movement of the conveyor.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A dolly apparatus for use on an assembly line, the dolly apparatus comprising:
a base frame;
a swing out arm that is rotatably connected to the base frame by a pivot linkage, the swing out arm biased toward an installation position by gravity;
an automatic arm closing assembly that moves the swing out arm from the installation position extending laterally beyond the base frame and into a conveying path of a vehicle body to an initial position extending longitudinally and out of the conveying path of the vehicle body, the automatic arm closing assembly comprising:
an engagement member located laterally outside the base frame;
a swinging linkage that is rotatably connected to the base frame;
a support rod that connects the engagement member to the swinging linkage; and
a connector rod that connects the swinging linkage to the pivot linkage, the engagement member having a retracted position and an extended position;
wherein the connector rod moves with rotation of the swinging linkage and rotates the pivot linkage thereby moving the swing out arm within a plane lying entirely above the base frame from the installation position with an outward terminal end laterally outside the base frame to the initial position with movement of the engagement member from the extended position to the retracted position.

2. The dolly apparatus of claim 1, wherein the engagement member comprises a roller.

3. The dolly apparatus of claim 1 further comprising another connector rod that extends laterally outward from the base frame and a synchronization member located at a distal end of the another connector rod.

4. The dolly apparatus of claim 3, wherein the synchronization member comprises a roller.

5. The dolly apparatus of claim 1, wherein the swinging linkage comprises a pair of lateral bars and a pair of longitudinal bars that are connected to the lateral bars at pivot locations, the lateral bars rotatably connected to the base frame.

6. The dolly apparatus of claim 5, wherein the connector rod is connected to one of the pair of lateral bars.

7. An assembly line system for assembling vehicles, the assembly line system comprising:
a conveyor comprising a vehicle support structure comprising a column structure that supports a vehicle frame thereon;
a dolly apparatus for use on an assembly line, the dolly apparatus comprising:
a base frame;
a swing out arm that is rotatably connected to the base frame by a pivot linkage, the swing out arm biased toward an installation position by gravity;
an automatic arm closing assembly that moves the swing out arm from the installation position extending laterally beyond the base frame and into a conveying path of a vehicle body to an initial position extending longitudinally and out of the conveying path of the vehicle body, the automatic arm closing assembly comprising:
an engagement member located laterally outside the base frame;
a swinging linkage that is rotatably connected to the base frame;
a support rod that connects the engagement member to the swinging linkage; and
a connector rod that connects the swinging linkage to the pivot linkage, the engagement member having a retracted position and an extended position;
wherein the connector rod moves with rotation of the swinging linkage and rotates the pivot linkage thereby moving the swing out arm within a plane lying entirely above the base frame from the installation position with an outward terminal end laterally outside the base frame to the initial position with movement of the engagement member from the extended position to the retracted position as the engagement member engages the column structure.

8. The assembly line system of claim 7, wherein the engagement member comprises a roller.

9. The assembly line system of claim 7, wherein the dolly apparatus further comprises another connector rod that extends laterally outward from the base frame and a synchronization member located at a distal end of the another connector rod, the synchronization member located to engage the column structure.

10. The assembly line system of claim 9, wherein the synchronization member comprises a roller.

11. The assembly line system of claim 7, wherein the swinging linkage comprises a pair of lateral bars and a pair of longitudinal bars that are connected to the lateral bars at pivot locations, the lateral bars rotatably connected to the base frame.

12. The assembly line system of claim 11, wherein the connector rod is connected to one of the pair of lateral bars.

* * * * *